United States Patent [19]

Ruble, deceased

[11] 4,289,743

[45] Sep. 15, 1981

[54] DOUBLE VENTURI CARBON BLACK REACTOR SYSTEM

[75] Inventor: Theodore A. Ruble, deceased, late of Fort Worth, Tex., by Eulalia B. Ruble, executrix

[73] Assignee: Sid Richardson Carbon & Gasoline Co., Fort Worth, Tex.

[21] Appl. No.: 74,741

[22] Filed: Sep. 12, 1979

Related U.S. Application Data

[62] Division of Ser. No. 812,345, Jul. 1, 1977, Pat. No. 4,213,939.

[51] Int. Cl.³ .......................... C01B 31/02; C09C 1/48
[52] U.S. Cl. ..................................... 423/450; 423/456
[58] Field of Search ....................... 423/449, 450, 456; 422/150

[56] References Cited

U.S. PATENT DOCUMENTS

| | | | |
|---|---|---|---|
| 3,877,876 | 4/1975 | Cheng | 423/456 X |
| 3,984,528 | 10/1976 | Cheng et al. | 423/456 |
| 4,046,894 | 9/1977 | Cheng | 423/456 |
| 4,127,387 | 11/1978 | Vanderveen et al. | 423/450 |

*Primary Examiner*—O. R. Vertiz
*Assistant Examiner*—Gregory A. Heller
*Attorney, Agent, or Firm*—Vinson and Elkins

[57] ABSTRACT

A carbon black reactor capable of producing carbon black of varying properties is disclosed comprising a longitudinally extending reactor tunnel having combustion, reaction, and quench zones in contiguous axial alignment. First and second venturi flow constrictions are provided in spaced relationship in the reaction zone of the reactor tunnel to create a pressure profile in the reaction zone. The pressure profile produces carbon blacks having certain physical properties. The second venturi constriction may be provided with means for varying the effective area of the second constriction for altering the pressure profile in the reactor tunnel to vary the properties of the produced carbon black. Further, carbon blacks of varying properties are produced for a given pressure profile by varying the point and direction of feedstock oil injection into the reaction zone.

12 Claims, 5 Drawing Figures

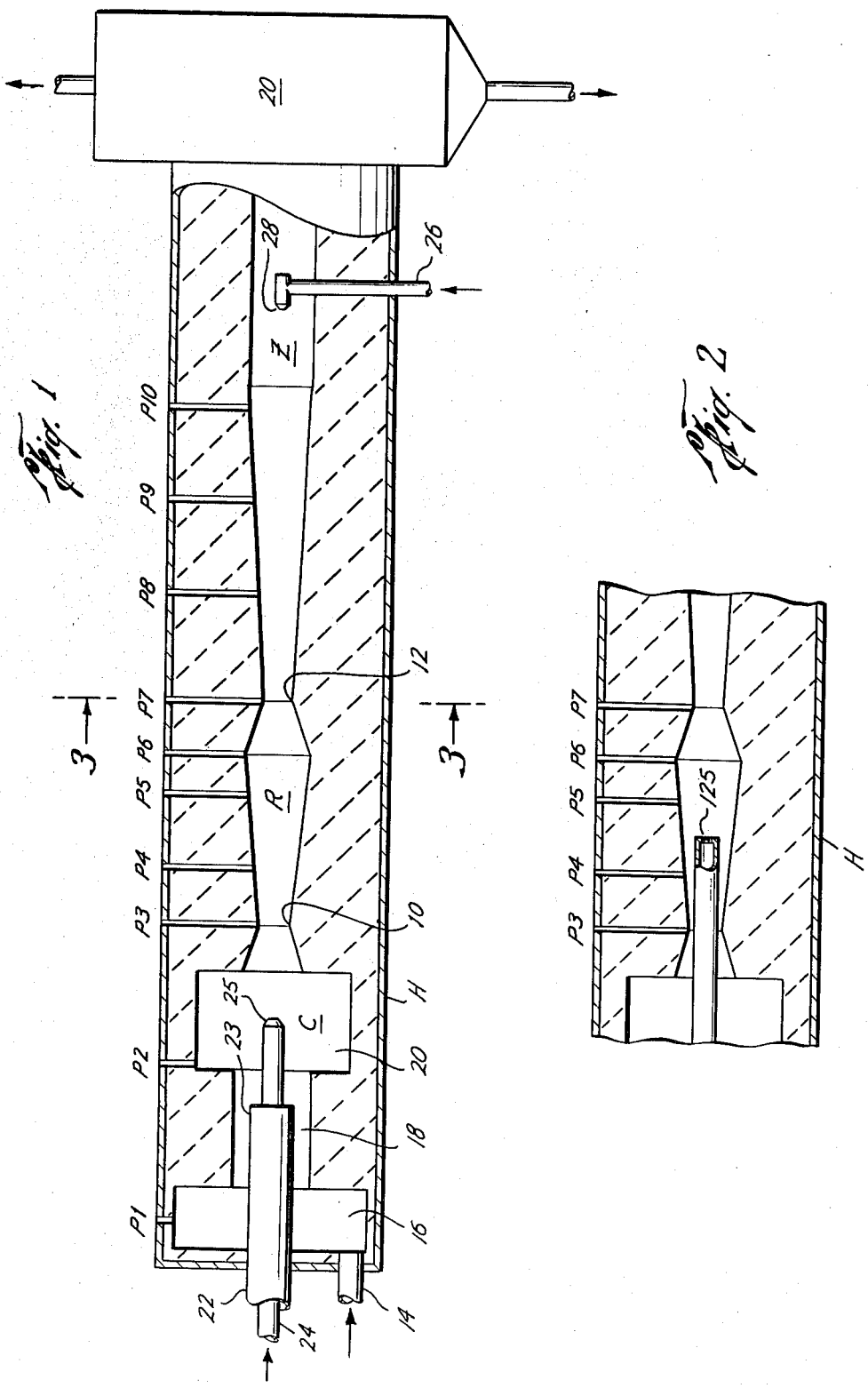

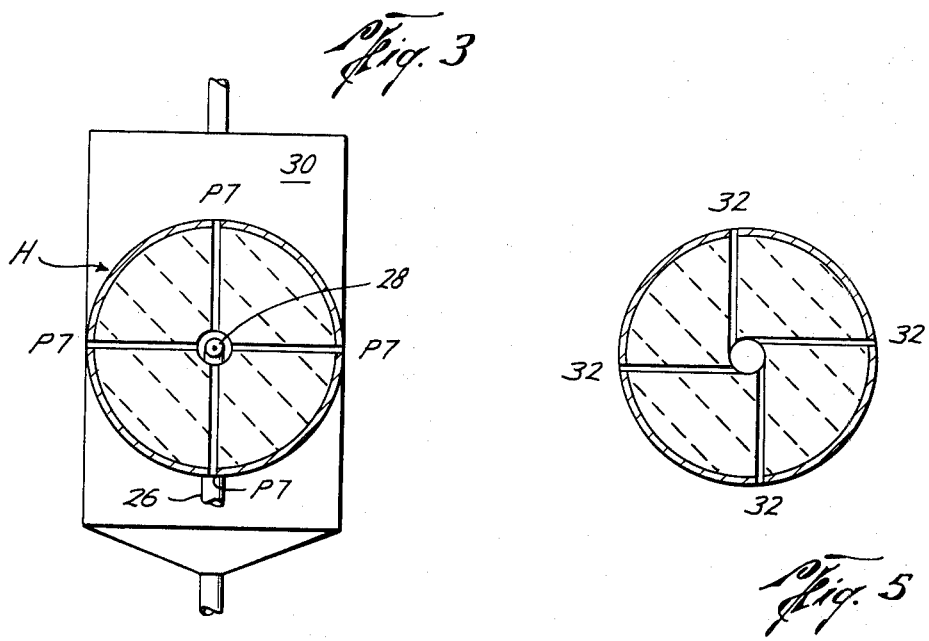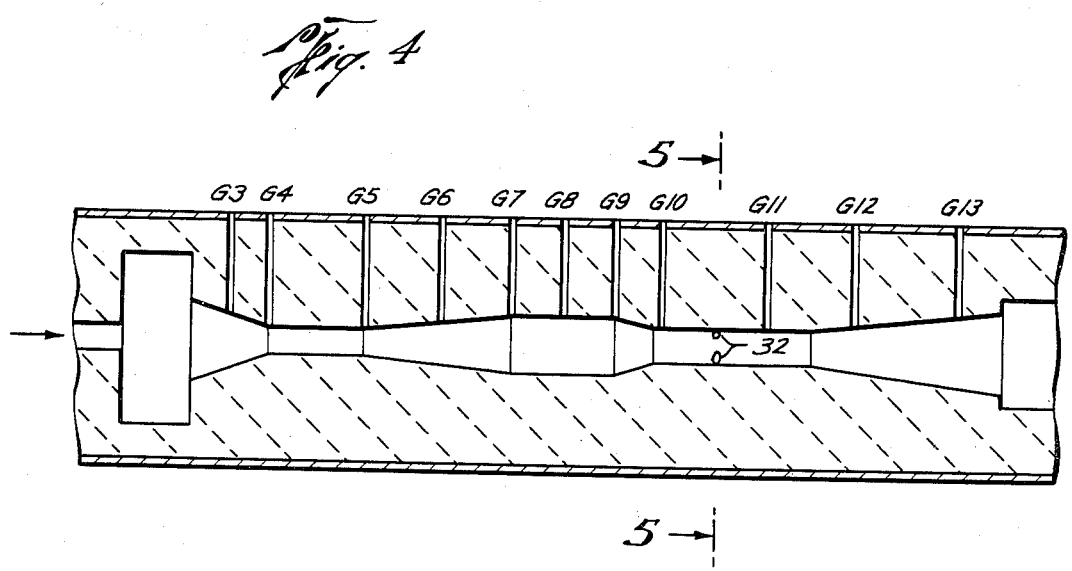

DOUBLE VENTURI CARBON BLACK REACTOR SYSTEM

BACKGROUND OF THE INVENTION

This application is a division of co-pending application Ser. No. 812,335 filed July 1, 1977, now U.S. Pat. No. 4,213,939.

This invention relates to systems for carbon black production, and more particularly to systems for producing carbon black of varying properties.

Carbon black reactors and methods of producing carbon black are well known in the prior art. Most modern carbon black reactors comprise a longitudinally extending reactor tunnel of refractory material of generally circular cross-sectional configuration defining combustion, reaction and quench zones in contiguous axial alignment. A hydrocarbon fluid fuel, usually natural gas or fuel oil, is burned in the combustion zone with a stream of process air furnished by a blower. The hot gases produced by the combustion of the fuel are directed into the reaction zone of the reactor tunnel and admixed with injected carbon black feedstock, usually a heavy aromatic oil. As the oil enters the flowing hot gases, it evaporates and undergoes a series of reactions to produce the product carbon black. The reacting carbon black and hot gases are quenched, usually by water spray, in the quench zone to a temperature below that required for reaction. The produced carbon black and off gases are collected and separated.

The physical and chemical changes that occur in the formation of carbon black from the evaporated feedstock oil are very complex. Heat is transferred rapidly to the oil vapor from the hot combustion gases, hot refractory, and combustion of a portion of the oil by residual oxygen. Under these conditions, feedstock oil molecules are dehydrogenated forming carbon nuclei. The nuclei grow in size to form particles which aggregate into cluster-like agglomerates, commonly known as "structure." The particles continue to grow in size after the "structure" is formed. These two properties, "structure" and particle size, are of a paramount importance in the production of carbon black since they determine to a large extent the properties of manufactured articles containing carbon black. Carbon blacks of high "structure" level and small particle size are particularly valuable since they impart increased resistance to abrasion to rubber products.

The particle size and "structure" level of produced carbon black may be measured by a variety of tests. Particle size is normally determined by measuring the surface area of the produced carbon black particles. Surface area may be determined directly or indirectly. The "tint" test, an indirect determination, measures the ability of a produced carbon black to cover the surface of a finely divided zinc pigment as compared with a standard carbon black of known particle size. Adsorptive tests are used to directly measure the surface area and thus particle size of produced carbon black. Included among these adsorptive tests are the nitrogen adsorption test, the iodine test, and the cetylmethyl ammonium bromide (CTAB) test. The CTAB molecules are too large to enter pores in the carbon black particles that may be entered by smaller molecules such as nitrogen. The difference between the CTAB test results and the nitrogen adsorptive test results is a measure of the porosity of the carbon black particles, another important property. "Structure" level is measured by the amount of dibutyl phthalate absorbed by a given sample of produced carbon black. The sample of carbon black may be tested for DBP absorption both before and after being subjected to an exact crushing pressure, since the "structure" level of produced carbon black drops to a lower constant value upon mechanical working, such as would be encountered by mixing carbon black with other raw materials to produce manufactured articles. The test is known as the DBP test when it is performed without crushing the carbon black. When the carbon black is crushed before absorption, the test is known as the "24M4 DBP" test since the sample is subjected to 24,000 p.s.i. of pressure four times before the dibutyl phthalate is added. A direct test of the properties of produced carbon black may be carried out by compounding the carbon black into manufactured articles which are then subjected to tests. Representative of these tests is the "road test." Samples of produced carbon black are compounded into a standard rubber formulation, made into tire treads, and tested for abrasion resistance on the road. A standard carbon black is tested to give a reference value arbitrarily set at 100. Values greater than 100 indicate superior resistance to abrasion and values less than 100 indicate inferior resistance.

It is well known in the art that smaller particle size can be achieved by reacting the feedstock oil in an area of the reaction zone where the flowing hot gases have an increased velocity. It is well known in the art that such increased velocity of the flowing hot gases can be achieved through a constriction in the reactor tunnel. Venturi constrictions are among the configurations of constrictions employed. Nevertheless, it is also known that "structure" formation is favored by higher pressures in the reaction zone. Since the constrictions employed to increase velocity have the effect of lowering pressure, smaller particle size is normally obtained at the expense of "structure." Thus, in the prior art, carbon black reactors particle size and "structure" level were balanced against each other to provide an acceptable carbon black product. Representative of prior art carbon black systems employing one venturi or other constriction in the reaction zone are Cheng U.S. Pat. No. 3,877,876; Latham U.S. Pat. No. 3,256,065; Heller U.S. Pat. No. 2,851,337; and Heller U.S. Pat. No. 3,490,869. Representative of prior art carbon black systems using the two non-Venturi constrictions are Sweigert U.S. Pat. No. 2,682,450; Hess U.S. Pat. No. 3,222,136; and Schirmer U.S. Pat. No. 3,248,252. None of the references show or suggest the use of two venturi constrictions in the reaction zone to create novel pressure profiles therein.

A further problem encountered with prior art carbon black reactors is that a variety of carbon blacks of different properties are desired. Each prior art carbon black reactor can be adjusted to produce only four or five grades of carbon black out of the seventy or more grades that are recognized. Adjustment in the prior art carbon black reactors to produce different grades of carbon black is commonly done by changing such factors as velocity, air to fuel ratios, air to feedstock ratios, position and direction of the feedstock injection, and quench position. Grades of carbon black are normally determined by particle size, "structure" level, porosity, and degree of oxidation of the particle surface. Most lower grades of carbon black have large particle size and low "structure" level. Higher grades have small particle size and high "structure" level. Within a given particle size and structure range, the degree of oxidation of the surface and the degree of microporosity may vary; these properties should be controlled. Some grades have a porous surface and others do not. Thus, the problems of the prior art devices are not only the difficulty of producing small particle size, high "structure" level carbon blacks, but also the limitation as to the number of grades of carbon black of different properties that can be produced in a single carbon black reactor.

SUMMARY OF THE INVENTION

Applicant solves the problem of prior art carbon black reactors of maintaining an acceptable "structure" level while minimizing particle size by providing an apparatus and method for creating pressure profiles which favor initial formation of "structure" and then prevent undue growth of the carbon black particles thereafter. The method and apparatus solves the problem of producing a variety of grades of carbon black in a single reactor by altering the pressure profiles, to thereby vary the "structure" level and particle size. The point and direction of feedstock oil injection is varied for a given pressure profile to obtain different carbon black grades with various "structure" levels and particle sizes. An oxidant gas or a non-oxidant gas at elevated or ambient temperature may be injected into the reacting carbon black to produce oxidized surface or non-oxidized surface carbon black grades.

It is therefore an object of the present invention to provide a carbon black reactor capable of producing carbon black of small particle size while maintaining an acceptable "structure" level.

It is a further object of this invention to provide a carbon black reactor capable of producing and altering pressure profiles within the reaction zone of the reactor tunnel to produce carbon blacks of different grades.

It is a further object of the present invention to vary the point and direction of carbon black feedstock oil injection for given pressure profiles to vary the grade of the produced carbon black.

It is a further object of the present invention to inject and vary the oxidizing nature and temperature of the secondary process gases for given pressure profiles to vary the grade of produced carbon black.

BRIEF DESCRIPTION OF THE DRAWINGS

Other objects, features, and advantages of the invention will be understood more readily from the following drawings and detailed description when read in conjunction with the appended claims.

FIG. 1 is a schematic sectional view of the overall structure of the preferred embodiment of the present invention;

FIG. 2 is a schematic sectional view of a portion of the preferred invention showing substantially zero angle axial feedstock oil injection;

FIG. 3 is a schematic sectional view taken along line 3—3 in FIG. 1;

FIG. 4 is a schematic view of a variation of the present invention;

FIG. 5 is a sectional schematic view taken along line 5—5 in FIG. 4.

DETAILED DESCRIPTION

FIG. 1 shows the overall structure of the preferred embodiment of the present invention with axial injection of the feedstock oil at a point upstream from the first venturi constriction. The carbon black reactor is formed from a longitudinally extending reactor tunnel of general circular cross-sectional configuration and varying diameters. The reactor normally comprises a housing H lines with refractory material to form the reactor tunnel. A combustion zone C a reaction zone R, and a quench zone Z are defined within the reactor tunnel in contiguous axial alignment. A first venturi flow constriction 10 and a second venturi flow constriction 12 having convergent sections, throats, and divergent sections are disposed within the reaction zone R and are spaced from each other along the longitudinal axis of the reactor tunnel. The ratio of the true physical area of the second venturi constriction to the area of the first venturi constriction may be of any value, but it is preferred that the ratio be within the range or from about 1.0 to about 1.7. The venturi constrictions may have throats of any length, including zero length. Although any venturi shape may be used for the two venturi constrictions, it is preferred that the angles of convergence, the upstream angles, of the two be 30° or less and that the angles of divergence, the downstream angles, be 15° or less. The flow of gases through the reactor tunnel may be axial, vortex, or any other flow.

Process air is directed from air inlet 14 to air plenum 16. An air passage 18 is provided for open communication between the air plenum 16 and a combustion chamber 20. A pipe 22 for carrying the fluid fuel to be burned in the combustion zone enters the reactor tunnel, preferably through air plenum 16 and air passages 18. Nozzles 23 are provided at the downstream end of the fluid fuel pipe 22 for mixing the fluid fuel with the process air for burning in the combustion chamber 20. Thus, air inlet 14, air plenum 16, air passage 18, fuel pipe 22, and nozzle 23 comprise a means for introducing a fluid fuel and oxidant gas into the combustion zone C for combustion therein.

A feedstock oil pipe 24 enters the reactor tunnel, preferably through air plenum 16 and air passage 18, and extends in the preferred embodiment to a point near the exit of combustion chamber 20. A nozzle 25 is provided at the downstream end of the feedstock oil pipe 24 for injecting the oil into the reaction zone as a spray oil droplets. Thus oil pipe 24 and nozzle 25 comprise a means for injecting hydrocarbon feedstock into the reaction zone R. The nozzle is preferably constructed to deliver a wide angle spray of oil droplets in the shape of a cone, although as shown in FIG. 2 a zero degree angle spray nozzle 125 may be used. The cone spray may be hollow or solid. The embodiments of the present invention also provide for radial rather than axial injection of the feedstock oil. Radial injection is accomplished through one or more of the ports designated P in FIGS. 1 and 2. These ports are also used for sampling the pressures within the reactor tunnel to define the pressure profiles therein. The feedstock oil pipe 24 is preferably axially adjustable so as to be capable of injecting a spray of oil droplets at different points along the longitudinal axis of the reaction zone. It is preferred that the feedstock oil pipe 24 be disposed at a point very near the downstream end of the combustion chamber 20 well before the first venturi constriction in the reaction zone at a point where combustion of the fluid fuel is substantially complete. As shown in FIG. 2, the feedstock oil pipe may be disposed at a point between the first and second venturi flow constrictions.

The exact pressure profile created within the carbon black reactor depends upon the ratio of the effective area of the second venturi constriction to the effective area of the second. For the purpose of this application, the effective area of the venturi flow constriction is defined to be that constriction area that will produce a given pressure drop in gases flowing through the constriction at a given velocity. The effective area of the venturi flow constriction is somewhat less than the true physical area of the constriction because of the presence of a boundary layer of relatively immobile gases lying next to the refractory material. Decreasing the thickness of the boundary layer or preventing its detachment and resultant constriction will increase the effective area of the venturi constriction and thus increase the ratio of the effective area of the second constriction to the effective area of the first. Conversely, the effective area of the second constriction may be decreased by increasing the thickness of the boundary layer or aiding in its detachment. This, of course, would reduce the ratio of the effective area of the second constriction to the effective area of the first.

Varying the ratio of the effective areas results in the creation of new pressure profiles which, given that all other factors are constant, produces different grades of carbon black. Means are provided on the second venturi flow constriction for altering the effective area of the constriction. Since the venturi constrictions are formed from rigid refractory material, altering the ratio of the effective areas of the two constrictions is preferably accomplished by injection of gases through ports in the throat of the second venturi constriction. These ports comprise means for injection of gases into the reaction tunnel at the second venturi constriction to control the effective area of the second constriction. When the ports are so arranged as to inject the secondary gases radially into the second venturi constriction and a high flow rate of secondary gas is used, the effective area of the constriction is increased, thereby increasing the ratio of the effective area of the second constriction to the effective area of the first. Tangential injection of the secondary gases results in a decrease in the effective area of the second venturi constriction and in the ratio of the effective areas.

Disposed within the quench zone Z are quench means for injecting a quench liquid, preferably water, to cool the hot flowing gases and reacting carbon black. The quench means preferably comprises a water pipe 26 ending in a quench nozzle 28. Collection means 30 are provided downstream of the quench zone Z to separate the produced carbon black from the off gases.

In operation, process air is introduced through air pipe 14 into air plenum 16. The process air travels through air passage 18 and mixes with the fluid fuel in combustion chamber 20. The fluid fuel enters through fuel pipe 22 and is injected into and mixed with the process air by nozzles 23. Combustion occurs in combustion chamber 20. The carbon black feedstock oil enters through oil pipe 24 and is injected into and mixed with the hot combustion gases by nozzle 25. The reacting feedstock oil and hot combustion gases travel through the reaction zone through the pressure profile created by first venturi constriction 10 and second venturi constriction 12. The ratio of the true area of the second venturi constriction to the first venturi constriction is between about 1.0 to about 1.7. The carbon black reaction is quenched in the quench zone by water spray from water pipe 26 and quench nozzle 28. The produced carbon black is then separated from the off gases. Injection of the feedstock oil may be axial or radial. Whether axial or radial, the injection may occur before the first venturi constriction or between the first and second venturi constrictions. If axial, the injection may be zero angle or angular cone spray. The cone spray may be hollow or solid. The pressure profile produced by a given ratio of the true areas of the constrictions may be altered by changing the effective area of the second venturi constriction by injection of secondary process gases at the second venturi throat. The injection of the secondary process gases may be radial or tangential. The secondary gases may be oxidizing or non-oxidizing, and may be at an elevated or ambient temperature.

Aerodynamic surveys were made on variations of the present invention to determine the pressure profiles created in the carbon black reactors. Four different sizes of the second venturi constriction were used with a constant size first constriction, thereby giving four different ratios of the true physical area of the second venturi to the physical area of the first. These ratios were 1.000, 1.210, 1.440, and 1.703. Pressure data for the four variations is given in Table I.

TABLE I

| PSIG AT PRESSURE POINT INDICATED | | | | | | | | |
| --- | --- | --- | --- | --- | --- | --- | --- | --- |
| Run | A2/A1 | P-2 | P-3 | P-4 | P-5 | P-6 | P-7 | P-8 |
| 31A | 1.000 | 7.28 | 6.45 | 3.52 | 1.78 | 1.42 | 4.01 | 4.63 |
| 32 | 1.210 | 5.38 | 4.48 | 0.87 | −1.88 | −4.42 | −0.15 | 0.18 |
| 33 | 1.440 | 5.78 | — | 1.20 | — | −5.56 | −1.61 | — |
| 34 | 1.703 | 5.50 | — | 1.02 | — | −5.68 | −1.70 | — |
| Run | A2/A1 | P-9 | P-10 | P-11 | P-12 | P-13 | P-14 | P-15 |
| 31A | 1.00 | 5.00 | 5.14 | 4.75 | 1.18 | −2.08 | −6.05 | −3.52 |
| 32 | 1.210 | 1.38 | 1.62 | 1.55 | −1.50 | −3.53 | −3.96 | −3.06 |
| 33 | 1.440 | — | 0.74 | 0.56 | −1.40 | — | −1.90 | −1.92 |
| 34 | 1.703 | — | 0.68 | 0.45 | −1.37 | — | −1.60 | −1.74 |
| Run | A2/A1 | P-16 | P-17 | P-18 | | | | |
| 31A | 1.000 | −2.55 | −1.00 | −0.43 | | | | |
| 32 | 1.210 | −1.98 | −0.79 | −0.37 | | | | |
| 33 | 1.440 | −1.56 | −0.60 | — | | | | |
| 34 | 1.703 | −1.48 | −0.49 | — | | | | |

As can be seen in the data in Table I, the minimum pressure is associated with the second venturi constriction when the true area of the second constriction is equal to the area of the first. When the ratio of true area of the second constriction to the true area of the first equals 1.703, the minimum pressure is associated with the first venturi constriction. Thus increasing the area ratio from 1.000 to 1.703 dramatically drops the pressure in the region between the throats.

An aerodynamics survey was performed on a variation of the present invention shown in FIG. 4 having a true area ratio equal to 1.703 and having venturi throats of finite length wherein a secondary process gas was injected into the second venturi constriction. The secondary gas was air and was injected tangentially as shown in FIG. 5 at the middle of the second venturi through four ports 32 of equal size spaced 90° apart around the circumference. Five runs were conducted using this apparatus, all with the same primary air rate. Pressure profiles obtained from these runs are summarized in Table II.

TABLE II

| Run | Secondary Air as % of Primary Air | PSIG AT PRESSURE POINT INDICATED | | | | | |
|---|---|---|---|---|---|---|---|
| | | G-2 | G-3 | G-4 | G-5 | G-6 | G-7 |
| 41 | 0 | 6.76 | — | −0.58 | −5.32 | −0.49 | 0.95 |
| 42 | 5 | 6.94 | — | −0.47 | −6.91 | −1.80 | 0.20 |
| 43 | 10 | 6.90 | — | −0.46 | −6.89 | −1.43 | 0.18 |
| 44 | 15 | 6.85 | — | −0.51 | −6.58 | −0.98 | 0.53 |
| 45 | 50 | 7.09 | — | 0.23 | −0.70 | 2.31 | 3.20 |

| Run | Secondary Air as % of Primary Air | G-8 | G-9 | G-10 | G-11 | G-12 | G-13 |
|---|---|---|---|---|---|---|---|
| 41 | 0 | 1.46 | 1.54 | 0.10 | −2.53 | −2.10 | −0.35 |
| 42 | 5 | 0.26 | 0.45 | 0.00 | −1.90 | −1.59 | −0.26 |
| 43 | 10 | 0.67 | 0.87 | 0.00 | −2.06 | −1.75 | −0.29 |
| 44 | 15 | 1.05 | 1.19 | 0.03 | −2.19 | −1.78 | −0.33 |
| 45 | 50 | 3.58 | 3.70 | 0.30 | −3.30 | −4.53 | −0.36 |

Experiments were performed using the preferred embodiment of the present invention and other embodiments thereof to fully illustrate the effect upon the produced carbon black of creating and altering pressure profiles and varying other facts for a given pressure profile such as point and direction of feedstock oil injection.

The data of Table III correspond to runs made using the preferred embodiment of the present invention, as illustrated in FIG. 1. The ratio of the true area of the second constriction to the first was 1.0. All runs were made at an air rate of 331 standard cubic feet per second per square foot of cross-section of the throat and a volumetric ratio of air to fuel gas of 17 to 1. Process air was preheated to 600° F. using a natural gas of specific gravity 0.650 relative to air. An aromatic feedstock oil having a Bureau Mines correlation index of 125 was used. These runs were made with axial injection of the feedstock oil using a 30° cone spray injection nozzle. As illustrated by the tabulated results, a small particle size and high "structure" level were obtained, averaging 115 for the "tint" test and 114 for the 24M4 DBP test. Standard carbon black grades having this particle size possess a much lower "structure" level typically 102 to 108 for the 24M4 DBP test.

TABLE III

| Run No. | Air Oil Ratio | Oil Nozzle | Oil Nozzle Position & Orientation | DBP | 24M4 DBP | Iodine Adsorption | Tint | Nitrogen Surface Area | CTAB | Tread-wear Rating |
|---|---|---|---|---|---|---|---|---|---|---|
| 4 | 804 | 30° Hollow Cone | −1.8D, Axial | 154 | 113 | 131 | 116 | 128 | 114 | 109 |
| 5 | 804 | 30° Hollow Cone | −1.45D, Axial | 156 | 113 | 119 | 112 | | | |
| 6 | 811 | 30° Hollow Cone | −0.36D, Axial | 157 | 116 | 133 | 121 | 145 | 119 | 115 |
| 7 | 821 | 30° Hollow Cone | +0.36D, Axial | 152 | 115 | 134 | 109 | | | |
| 8 | 817 | 30° Hollow Cone | +1.09D, Axial | 154 | 116 | 128 | 120 | 139 | 121 | 110 |
| Avg. | 811.4 | | | 154.6 | 114.6 | 129.0 | 115.6 | | | |

| Run No. | PSIG, at Points | | | | | | | | |
|---|---|---|---|---|---|---|---|---|---|
| | P-2 | P-3 | P-4 | P-5 | P-6 | P-7 | P-8 | P-9 | P-10 |
| 4 | 14.10 | 8.40 | 12.37 | 12.91 | 13.11 | 2.84 | −1.64 | 0.78 | 1.27 |
| 5 | — | — | — | — | — | — | — | — | — |
| 6 | 13.28 | 8.12 | 11.67 | 12.26 | 12.46 | 2.34 | −1.42 | 0.86 | 1.40 |
| 7 | 13.13 | 7.46 | 11.16 | 11.77 | 11.97 | 2.11 | −1.19 | 0.86 | 1.40 |
| 8 | 12.60 | 6.99 | 10.71 | 11.27 | 11.46 | 1.73 | −1.29 | 0.78 | 1.27 |
| Avg. | 13.41 | 7.74 | 11.48 | 12.05 | 12.25 | 2.26 | −1.39 | 0.82 | 1.34 |
| Pressure Ratio | | 0.789 | | | 0.956 | 0.584 | | | |

Another series of runs were made using the embodiment of the invention shown in FIG. 2. Some of the runs were made with axial oil injection using a zero angle injection nozzle, varying the point of injection by axial adjustment of the oil pipe and nozzle. In some of the runs feedstock oil was injected radially into the reaction zone through one of the access ports designated by the letter P in FIG. 2. Again, the runs were made using an air rate of 331 standard cubic feet per second per square foot of cross-section of the throat and volumetric ratio of air to fuel gas of 17 to 1. Process air was preheated to 600° F. using a natural gas of specific gravity 0.650 relative to air. Again a feedstock oil of 125

BMCI was used. The data from these runs is tabulated in Table IV. As shown by the tabulated data, carbon black of average particle size and "structure" level were produced with zero angle axial injection and radial injection of the feedstock oil.

TABLE IV

| Run No. | Air Oil Ratio | Oil Nozzle | Oil Nozzle Position & Orientation | DBP | 24M4 DBP | Iodine Adsorption | Tint | Nitrogen Surface Area | CTAB | Tread-wear Rating |
|---|---|---|---|---|---|---|---|---|---|---|
| 1 | 695 | 0° Spray | 0, Axial | 152 | 108 | 110 | 109 | — | — | — |
| 2 | 695 | 0° Spray | −1.8D, Axial | 151 | 109 | 107 | 105 | — | — | — |
| 3 | 754 | 0° Spray | −1.8D, Axial | 156 | 110 | 121 | 108 | — | — | — |
| 11 | 808 | 0° Jet | P-3, Radial | 143 | 110 | 109 | 110 | — | — | — |
| 12 | 791 | 0° Jet | P-7, Radial | 138 | 94 | 118 | 114 | — | — | — |
| 13 | 798 | 0° Jet | −3.3D, Axial | 145 | 104 | 115 | 111 | 114 | 106 | 104 |
| 14 | 800 | 0° Jet | −4.0D, Axial | 137 | 106 | 107 | 109 | 108 | 103 | 98 |

| Run No. | P-2 | P-3 | P-4 | P-5 | P-6 | P-7 | P-8 | P-9 | P-10 |
|---|---|---|---|---|---|---|---|---|---|
| 1 | 13.40 | 7.94 | 11.76 | 12.20 | 12.40 | 2.65 | −1.86 | 0.59 | 0.98 |
| 2 | 13.40 | 7.65 | 11.62 | 12.20 | 12.40 | 2.40 | −1.64 | 0.59 | 1.08 |
| 3 | 14.05 | 8.77 | 12.30 | 12.81 | 12.99 | 2.99 | −1.57 | 0.64 | 1.18 |
| 11 | 11.50 | (Oil) | 8.43 | 9.07 | 9.24 | 1.67 | −1.25 | 0.59 | 1.18 |
| 12 | — | — | — | — | — | (Oil) | — | — | — |
| 13 | 11.26 | 8.81 | 8.61 | 9.21 | 9.44 | 3.31 | −1.33 | 0.46 | 1.00 |
| 14 | 11.33 | 8.81 | 8.57 | 9.15 | 9.51 | 3.41 | −2.16 | 0.49 | 1.02 |
| Pressure Ratio | | 0.804 | | | | 0.595 | | | |

Thus, it is evident from the foregoing that a carbon black reactor and method of producing carbon black has been described which overcomes several disadvantages found in prior art systems.

While the invention has been particularly shown and described with reference to preferred and alternative embodiments thereof, it will be understood by those skilled in the art that various changes in size, shape, materials and in the details of this illustrated construction may be made within the scope of the appended claims without departing from the spirit of the invention.

What is claimed is:

1. A method for the production of carbon black in a reactor of the type having a reaction tunnel of generally circular cross-section and varying diameter, said tunnel including a combustion zone, a reaction zone and a quench zone in contiguous axial alignment, which method comprises the steps of:
   introducing a fluid fuel and oxidant gas into said combustion zone for combustion therein to produce hot combustion product gases;
   flowing said hot combustion product gases downstream from said combustion zone into said reaction zone;
   introducing hydrocarbon feedstock into said hot combustion product gases in said reaction zone for reaction therewith to produce carbon black;
   flowing said admixed hydrocarbon feedstock and combustion product gases downstream through said reaction zone;
   passing said admixed combustion product gases and feedstock through first and second venturi flow constrictions disposed in said reaction zone and spaced longitudinally from each other;
   flowing said combustion product gases, feedstock and carbon black into said quench zone;
   quenching the reactions in said quench zone with a quench fluid; and
   separating the carbon black product from off gases downstream from said quench zone.

2. The method according to claim 1 wherein said hydrocarbon feedstock is injected axially into said combustion product gases in said reaction zone.

3. The method according to claim 1 wherein said hydrocarbon feedstock is injected radially into said combustion product gases in said reaction zone.

4. The method according to claim 1 wherein said feedstock is injected upstream from said first venturi constriction.

5. The method according to claim 1 wherein said feedstock is injected intermediate said first and second venturi constrictions.

6. The method according to claim 1 including additionally the step of injecting secondary process gases into said second venturi constriction to control the effective area thereof.

7. The method according to claim 6 wherein the secondary process gas is an oxidant.

8. The method according to claim 6 wherein the secondary process gas is a non-oxidant.

9. The method according to claim 6 wherein said secondary process gases are injected radially.

10. The method according to claim 6 wherein said secondary process gases are injected tangentially.

11. The method according to claim 6 wherein said secondary process gases are injected at ambient temperature.

12. The method according to claim 6 comprising additionally the step of pre-heating said secondary process gases prior to injection.

* * * * *